Dec. 19, 1961     A. L. LA MASTRA     3,013,768
SOLENOID AND PLUNGER
Filed Dec. 3, 1959
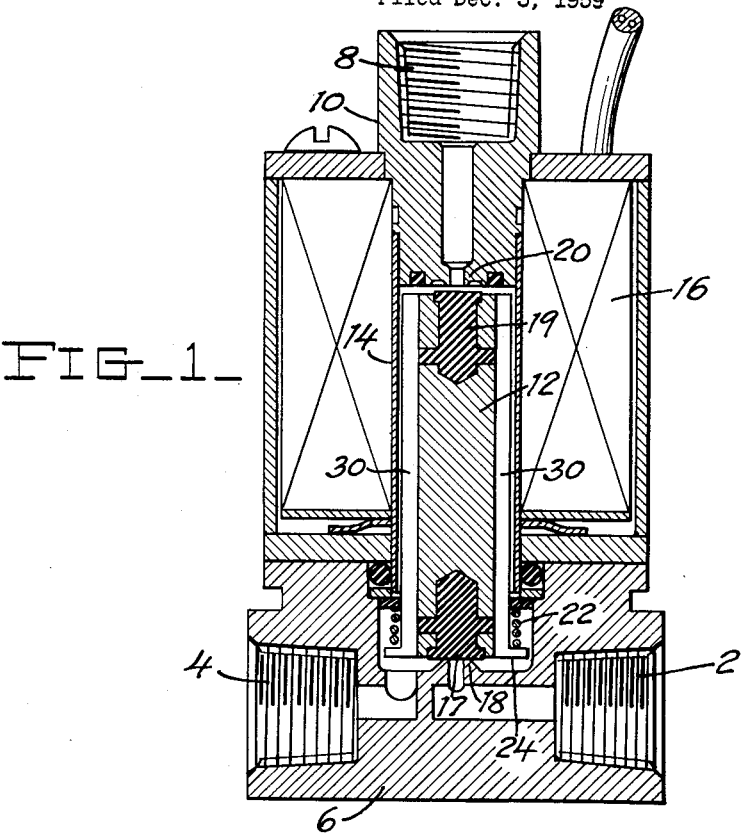
FIG_1_
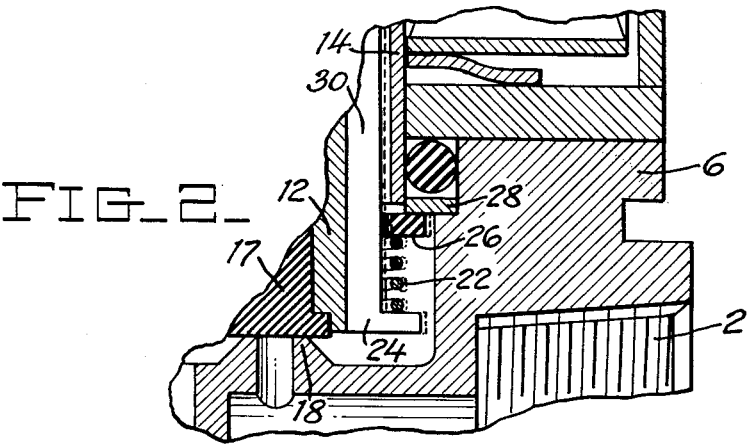
FIG_2_
INVENTOR.
ALFONSO L. LA MASTRA
BY
Albert Sperry
ATTORNEY

United States Patent Office 3,013,768
Patented Dec. 19, 1961

3,013,768
SOLENOID AND PLUNGER
Alphonso L. La Mastra, Elizabeth, N.J., assignor to Valcor Engineering Corporation, Kenilworth, N.J., a corporation of New Jersey
Filed Dec. 3, 1959, Ser. No. 857,086
6 Claims. (Cl. 251—129)

This invention relates to that type of solenoid which has a spring pressed plunger such as the plunger used in a solenoid operated valve. The invention is directed particularly to constructions which serve to eliminate the hum or noise often developed when such solenoids are energized by alternating current.

Various reasons have been advanced to explain the production of a humming sound or noise by a spring pressed plunger of an A.C. operated solenoid. Thus, it has been suggested that a slight eccentricity of the plunger within the tube in which the plunger moves gives rise to variations in the magnetic flux which cause the plunger to move toward one side or another of the tube. The spring is thereby displaced to a position eccentric to the plunger and, accordingly, tends to return the plunger to its original position each time the magnetic flux is changed. Since the flux changes rapidly when alternating current is used, an objectionable hum or noise is generated under such conditions. Whatever correct explanation may be the development of such sounds is objectionable in most types of equipment. Moreover, the vibrations resulting from such movement or noise tend to cause the sealing elements of solenoid operated valve members to deteriorate rapidly.

In accordance with the present invention, the noise and vibration of the plunger of an alternating current solenoid is eliminated or materially reduced and the life and effectiveness of the sealing elements of solenoid operated valves are increased.

These advantages are preferably attained by providing the spring means which urge a solenoid actuated plunger to one position with an anti-friction element located between one end of the spring means and a member against which the spring is urged. It is believed that the end of a spring which is mounted in this manner, being free to move with the plunger, does not tend to be deflected upon transverse movement of the plunger but remains concentric with the plunger. In any event, it is found that the use of such anti-friction means in combination with a spring serves to eliminate the hum and noise of the plunger of an A.C. operated solenoid.

Accordingly, it is an object of the invention to reduce the noise and hum of spring urged plungers of A.C. actuated solenoids.

Another object of the invention is to increase the life and effectiveness of sealing elements employed in solenoid operated valves actuated by alternating current.

A specific object of the invention is to provide the spring means of an A.C. actuated solenoid plunger with an anti-friction element located between one end of the spring and a member toward which said end is urged.

These and other objects and features of the present invention will appear from the following description thereof wherein reference is made to the figures of the accompanying drawing.

In the drawing:
FIG. 1 is a vertical sectional view through a typical solenoid operated valve embodying the present invention, and
FIG. 2 is an enlarged sectional view showing a portion of the construction illustrated in FIG. 1.

In that form of the invention chosen for purposes of illustration in the drawing, a three-way solenoid valve designed for the control of air or gas flow is provided with an inlet 2, a lower outlet 4 positioned in the base 6 of the valve and an upper outlet 8 positioned in the head 10 of the valve. A plunger 12 is movable within the brass tube 14 of the solenoid 16 to bring the sealing element 17 thereof into engagement with the lower valve seat 18 for cutting off flow to the outlet 4 and to bring the upper sealing element 19 thereof into engagement with the upper valve seat 20 for cutting off flow to the upper outlet 8. The plunger 12 is normally urged toward the lower valve seat 18 by a spring 22 but is movable toward the upper valve seat 20 against the action of the spring when the solenoid 16 is energized by alternating current.

The spring 22 is positioned concentric with the plunger 12 and bears at one end against the flange 24 on the lower end of the plunger 12. The upper end of spring 22 bears against a washer or other element 26 which is pressed against the stationary washer 28 that holds the rubber O-ring in place to seal the outer surface of the tube 14.

In accordance with the present invention, the washer 26 that is positioned between the upper end of spring 22 and the stationary washer 28 is formed of anti-friction material such as the fluoride polymer known as "Teflon." This material is characterized by its low co-efficient of friction and, therefore, slides freely over the surface of the stationary washer whenever the plunger 12 is moved transversely of its axis.

As shown in FIG. 2, the normal position of the plunger 12 is illustrated in full lines with the spring 22 arranged concentric with the plunger. However, if the plunger should be displaced laterally to the dotted line position of FIG. 2, both the spring 22 and the anti-friction washer 26 are moved transversely with the plunger. The spring 22 then remains concentric with the plunger and does not tend to urge the plunger back to its full line position. As a result, there is no action tending to oppose the lateral displacement of the plunger and it does not vibrate back and forth with changes in the alternating current flux.

The lateral displacement of the plunger 12 is limited by the tube 14 and is never very great since the clearance between the tube and plunger need only be a few thousandths of an inch or sufficient to assure free movement of the plunger between its raised and lowered positions under the action of the spring 22 and the solenoid 16. The flow of air or fluid lengthwise of the plunger from the inlet 2 to the upper outlet 8 takes place primarily along the channels or radially extending grooves 30 formed in the plunger.

The explanation of the operation of the solenoid operated construction illustrated is believed to be correct. In any event, it is found in practice that the presence of an anti-friction element between the end of the spring and the member against which the anti-friction element is urged serves to eliminate the noise or hum which is usually encountered when solenoids are actuated by alternating current.

It is also found that the life and effectiveness of the sealing elements 17 and 19 carried by the plunger is increased so that the valve functions more perfectly and for longer periods of time without requiring replacement or repair.

The spring 22 illustrated in the drawings is of a cylindrical type but it is also found that tapered or conical springs can be used in such constructions. Moreover, while the preferred anti-friction means employed consists of a washer formed of "Teflon" the washer may be formed of nylon or other material having a low co-efficient of friction. It is also possible to form the anti-friction means in shapes other than that illustrated if desired.

Although the invention has particular advantages when used in combination with solenoid operated valves, it can be employed with other assemblies embodying a solenoid operated plunger.

In view thereof, it should be understood that the particular embodiment of the invention shown in the drawing and described above is intended to be illustrative only and is not intended to limit the scope of the invention.

What is claimed is:

1. In combination with an alternating current solenoid, a member fixed with respect to the solenoid and presenting a substantially flat surface, an elongated plunger movable lengthwise with respect to the solenoid and fixed member but capable of limited transverse movement with respect thereto, a spring positioned between said flat surface of the fixed member and the plunger, said spring having one end thereof urged toward said flat surface and the other end thereof engaging said plunger, said plunger being movable longitudinally by the solenoid against the action of said spring, and friction reducing means positioned between said flat surface of the fixed member and said one end of the spring reducing resistance to transverse movement of said one end of the spring with respect to said flat surface of the fixed member upon transverse movement of the plunger.

2. In combination with an alternating current solenoid, a member fixed with respect to the solenoid and presenting a substantially flat surface, an elongated plunger movable lengthwise with respect to the solenoid and fixed member but capable of limited transverse movement with respect thereto, a laterally extending projection on said plunger, a coil spring surrounding the plunger and positioned between said flat surface and said projection, said spring having one end thereof urged toward said flat surface and the other end thereof urged toward the laterally extending projection on said plunger, said plunger being movable by the solenoid against the action of said spring, and a flat washer formed of material having a low coefficient of friction surrounding said plunger and positioned between said flat surface of the fixed member and said one end of the spring reducing resistance to transverse movement of said one end of the spring with respect to said flat surface of the fixed member upon transverse movement of the plunger.

3. In combination with an alternating current solenoid, a member fixed with respect to the solenoid and presenting a substantially flat surface, an elongated plunger movable lengthwise with respect to the solenoid and fixed member but capable of limited transverse movement with respect thereto, a laterally extending projection on said plunger, a coil spring surrounding the plunger and substantially concentric therewith, said spring being positioned between said flat surface and said projection, and having one end thereof urged toward said flat surface and the other end thereof urged toward the laterally extending projection on said plunger, said plunger being movable longitudinally by the solenoid against the action of said spring, and means for maintaining said spring in a position concentric with the plunger upon transverse movement of said plunger with respect to said fixed member comprising a flat washer formed of a fluorine polymer that is characterized by its low coefficient of friction surrounding the plunger and positioned between said flat surface of the fixed member and said one end of the spring reducing resistance to transverse movement of said one end of the spring with respect to said flat surface of the fixed member upon transverse movement of the spring with the plunger.

4. A valve comprising a valve seat, a sealing element movable in opposite directions into and out of engagement with said valve seat, a solenoid adapted to be actuated by alternating current, an elongated plunger movable longitudinally in one of said directions by said solenoid and having said sealing element carried thereby, a fixed member positioned adjacent said plunger and presenting a substantially flat surface, said plunger being capable of limited lateral movement with respect to said fixed member, a spring having one end thereof urged toward said flat surface and the opposite end thereof engaging the plunger, said spring being operable to move said plunger in the other of said directions, and friction reducing means positioned between said flat surface of the fixed member and said one end of said spring reducing resistance to lateral movement of the spring with said plunger and with respect to said flat surface of the fixed member.

5. A valve comprising a valve seat, a sealing element movable in opposite directions into and out of engagement with said valve seat, a solenoid adapted to be actuated by alternating current, an elongated plunger movable longitudinally in one of said directions by said solenoid and having said sealing element carried thereby, a fixed member positioned adjacent said plunger and presenting a substantially flat surface, said plunger being capable of limited lateral movement with respect to said fixed member, a coil spring surrounding said plunger and positioned between said flat surface and said plunger, said spring having one end thereof urged toward said flat surface and the other end thereof engaging said plunger, said spring being operable to move the plunger in the opposite of said directions, and a flat washer formed of material having a low coefficient of friction surrounding said plunger and positioned between said flat end of the fixed member and said one end of the spring reducing resistance to transverse movement of said one end of said spring with the plunger and with respect to said flat surface of the fixed member upon transverse movement of the plunger.

6. A valve comprising a valve seat, a sealing element movable in opposite directions into and out of engagement with said valve seat, a solenoid adapted to be actuated by alternating current, an elongated plunger movable longitudinally in one of said directions by said solenoid and having said sealing element carried thereby, a fixed member positioned adjacent said plunger and presenting a substantially flat surface, said plunger being capable of limited lateral movement with respect to said fixed member, a laterally extending projection on said plunger, a coil spring surrounding the plunger and substantially concentric therewith, said spring being positioned between said flat surface of the fixed member and said projection on the plunger and having one end thereof urged toward said flat surface and the other end thereof urged toward the laterally extending projection, said spring being operable to move the plunger in the other of said directions, and means for maintaining said spring in a position concentric with the plunger upon transverse movement of said plunger with respect to the fixed member comprising a flat washer formed of a fluorine polymer that is characterized by its low coefficient of friction surrounding the plunger and positioned between said flat surface of the fixed member and said one end of the spring reducing resistance to transverse movement of said one end of the spring with the plunger and with respect to the flat surface of the fixed member upon transverse movement of the plunger.

References Cited in the file of this patent

UNITED STATES PATENTS

| | | |
|---|---|---|
| 1,389,625 | Churchward | Sept. 6, 1921 |
| 2,543,010 | Gardner | Feb. 27, 1951 |
| 2,651,744 | Acklin | Sept. 8, 1953 |